United States Patent [19]

Kuo

[11] Patent Number: 5,156,455

[45] Date of Patent: Oct. 20, 1992

[54] SHOCK ABSORBER FOR THE LAMP OF AN AUTO LICENSE PLATE HOLDER

[76] Inventor: Shen-Shaon Kuo, 2 Fl., No. 157, Sec. 2, Hsin Hai Rd., Taipei, Taiwan

[21] Appl. No.: 834,950

[22] Filed: Feb. 14, 1992

[51] Int. Cl.⁵ .............................................. B60Q 1/56
[52] U.S. Cl. .................................................. 362/83.2
[58] Field of Search ........................................ 362/83.2

[56] References Cited

U.S. PATENT DOCUMENTS 2,562,740  7/1951  Rizer .................................. 362/83.2
2,618,089  11/1952  Rose .................................. 362/83.2

Primary Examiner—Carroll B. Dority
Attorney, Agent, or Firm—Browdy and Neimark

[57] ABSTRACT

A license plate holder formed by a base frame and a mating cover frame having an opening therethrough and an annular lamp therein. The lamp is held in place by resilient spaced sleeves about the lamp being clamped between clamping pieces on the base and cover frames.

2 Claims, 3 Drawing Sheets

A-A VIEW

C-C SECTION

B-B SECTION

SHOCK ABSORBER FOR THE LAMP OF AN AUTO LICENSE PLATE HOLDER

FIELD OF THE INVENTION

The present invention relates to a shock absorber for the lamp of an auto license plate holder, and particularly to a sheathing of the lamp at its clamping positions with some resilient, shockproof sockets and in position against each socket a multi-refraction unit provided on the cover frame of license plate holder to prevent showing of each socket while the lamp acts.

BACKGROUND OF THE INVENTION

As FIG. 6 shows, the annular lamp E of the conventional auto license plate holder F is clamped by the opposed arcuate clamping pieces C, D of base frame A and cover frame B to take its position therein. But the problem is that annular lamp E is a glass tube flexed into shape which is very fragile. Under the differently tight or loose conditions of clamping pieces C, D, annular lamp E is certainly very susceptible to any shocking from transportation or use. A record is even found of 40% damaged lamps in shipment of an export container. Such sever loose makes improvement of lamp of the auto license plate holder greatly necessary.

OBJECTS OF THE INVENTION

In view of the above-mentioned problem, the present invention provides a shock absorber for the lamp in an auto license plate holder. By sheathing the annular lamp at its clamping positions with some resilient, shockproof sockets and in position against each socket a multi-refraction unit arranged on the cover frame of license plate holder, the lamp is made to be shockproof, and some parts of it shaded by non-or-half-translucent sockets may nonetheless give their opposed area of cover frame the same degree of brightness by function of multi-refraction units.

SUMMARY OF THE INVENTION

A shock absorber for the lamp of an auto license plate holder is characterized in a resilient, shockproof socket which sheathes the annular lamp at each of its clamping positions and against each socket a multi-refraction unit arranged on the cover frame opposed to the base frame of license plate holder. With added shockproof socket between each pair of arcuate clamping pieces in both the cover frame and base frame of the license plate holder, annular lamp can be secured therebetween without any space left. And the license plate holder in which its annular lamp is shockproof can displays the same degree of brightness even in areas where the lamp is shaded by some non-or-half-translucent sockets, by the function of multirefraction units

SPECIFIC DESCRIPTION

Figures 1, 3:
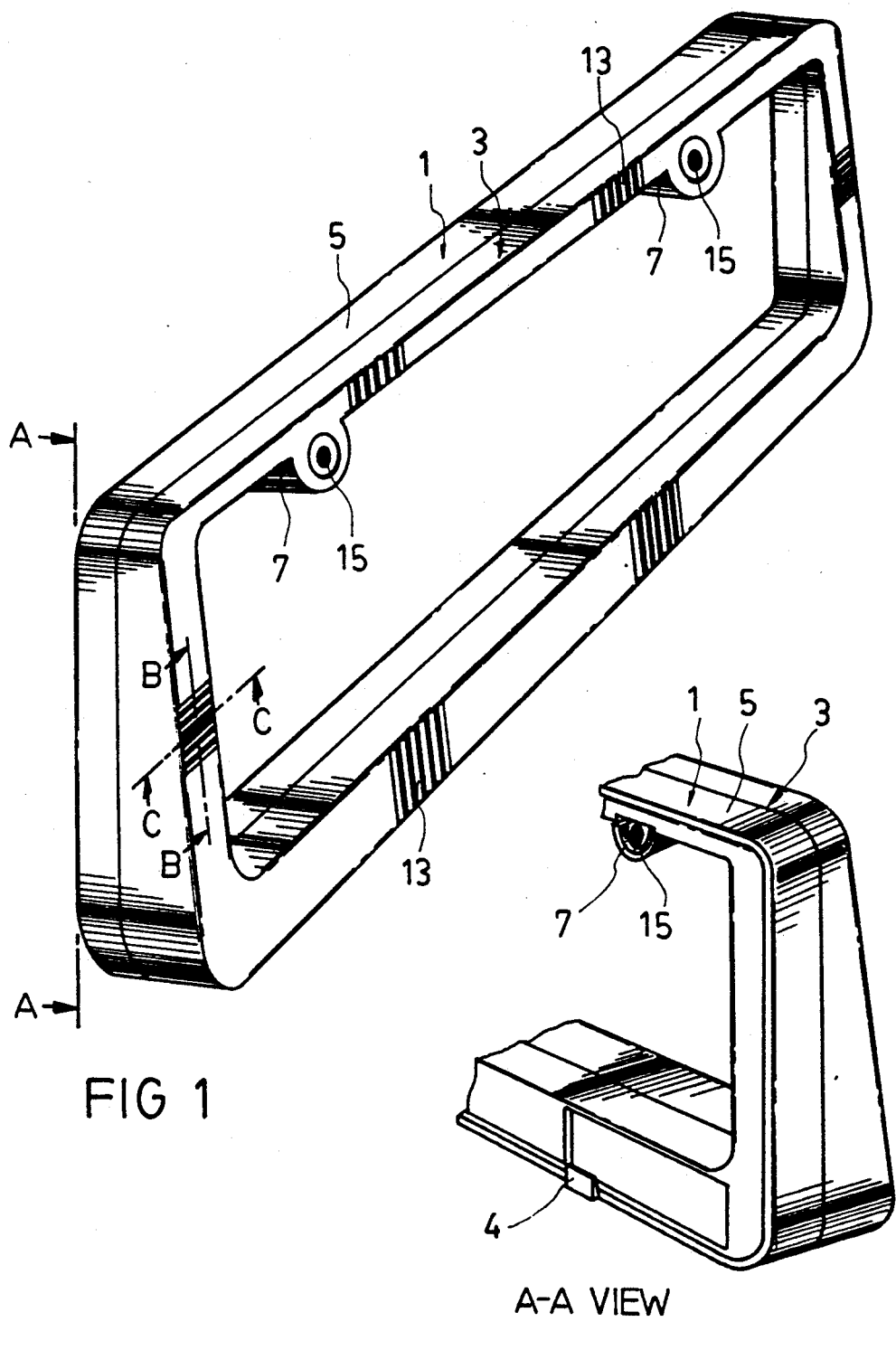
FIG. 1 is a perspective view of a preferred embodiment of the invention.
FIG. 3 is an A—A view from a direction of the A—A line in FIG. 1.
Figure 2:
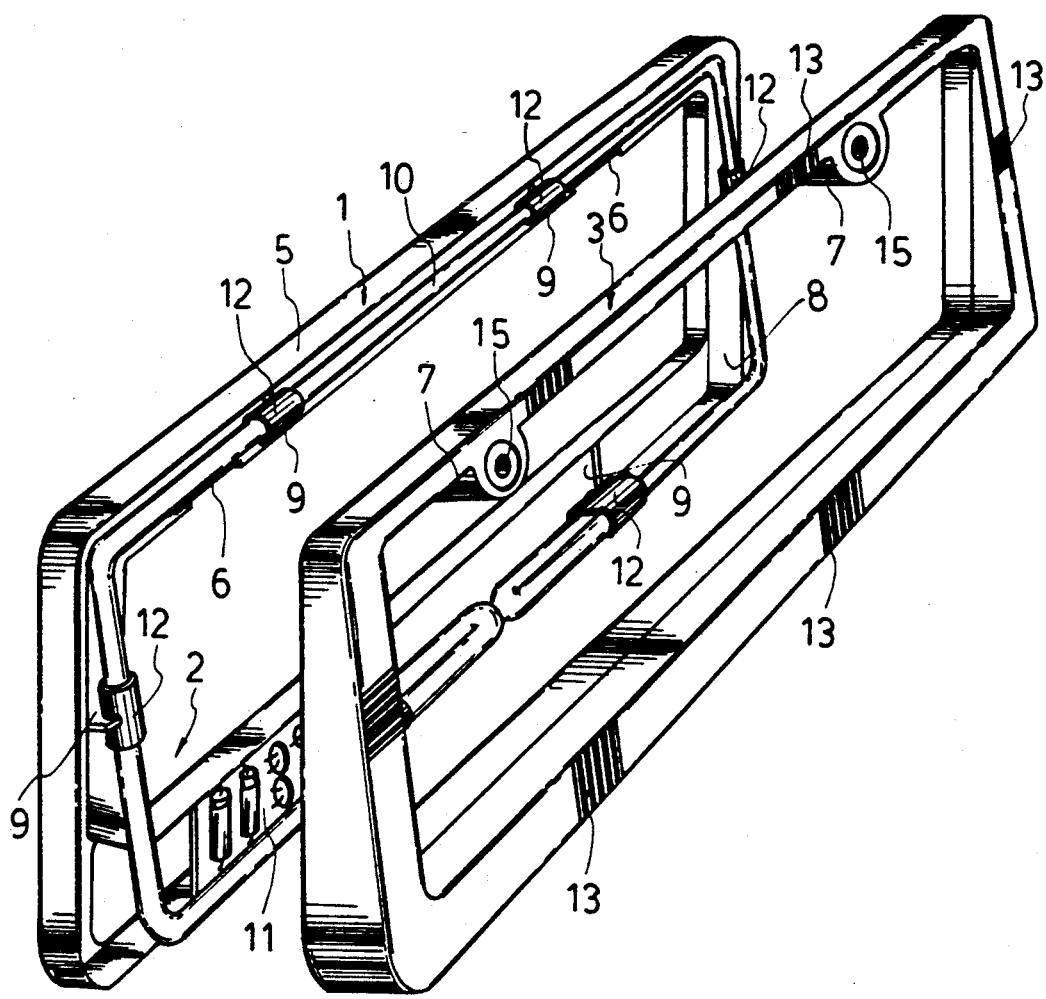
FIG. 2 is an exploded view of the invention in FIG. 1.
Figure 4:
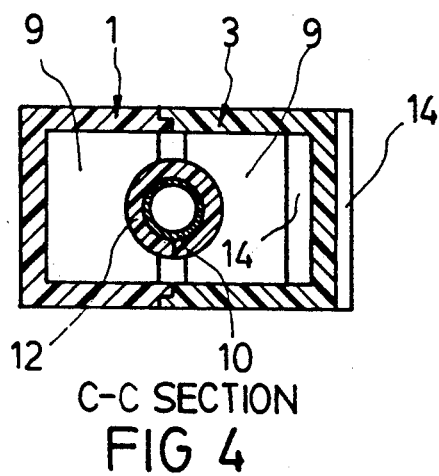
FIG. 4 is a sectional view taken along the C—C line in FIG. 1.
Figure 5:
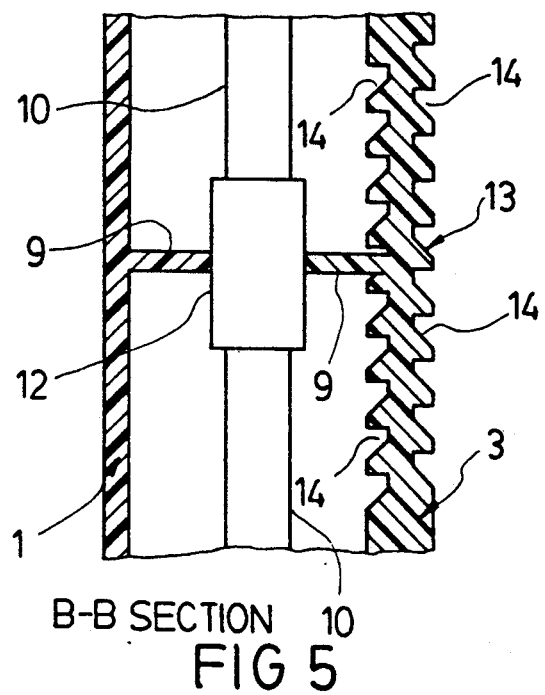
FIG. 5 is a sectional view taken along the B—B line in FIG. 1.
Figure 6:
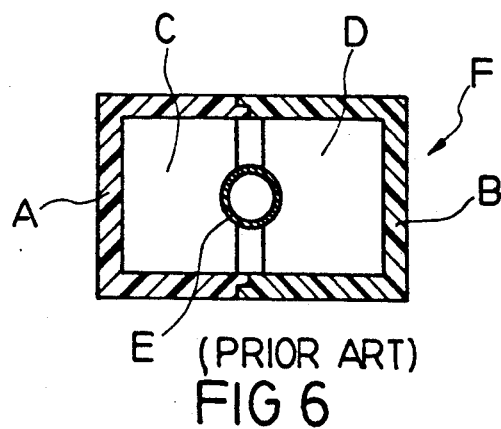
FIG. 6 shows the structure of the fixing of lamp in a conventionally used auto license plate holder.

As FIGS. 1-3 show, the present invention is made up by a base frame 1, an illumination assembly 2 and a cover frame 3. Wherein base frame 1 is a non-translucent hollow frame in a rectangular shape of size adapted to the license plate. As is seen, base frame 1 is open of its front side, and has an extended chucking piece 4 in the lower area of its back side for getting engaged with the lower area of license plate (as FIG. 3 shows). Two fixing slots 6 are provided in the inside of an upper cross bar 5 of it to enable engagement with two screw-hole posts 7 extended out from the back side of cover frame 3. The upper cross bar 5 of annular hollow part 8 is more narrow than the lower cross bar 8 thereof, and both are provided with some integrant arcuate clamping pieces 9 in position against those of cover frame 3 to get annular lamp 10 of illumination assembly 2 securely clamped therebetween (as FIGS. 4, 5 show). After engagement of two screw-hole posts 7 with two positioning slots 6 is made, cover frame 3 therefore gets positioned covering the base frame 1. In the meantime annular lamp 10 is securely clamped between pairs of opposed arcuate clamping pieces 9. Illumination assembly 2 is consisted of an annular lamp 10 and a transforming PC board 11. Since illumination assembly 2 has a structure generally the same as the convetional, further description is deemed unnecessary. In order to guard lamp 10 from shock, a shockproof socket 12 is used sheathing it at position of each of its contacts with arcuate clamping piece 9 (as FIGS. 2, 4 and 5 show). Shockproof socket 12 which is made from a heat-resisting material of suitable resilience is an open, columnar sleeve. It not just can accomplish a secure clamping of annular lamp 10 by means of pairs of arcuate clamping pieces 9 but also has shockproof function for it to prevent any shock from transportation or in use from reaching thereto. Cover frame 3 is a colorless, translucent frame hollow inside in adaption to base frame 1. Also there are some of opposed arcuate clamping pieces 9 provided in the cover frame hollow part in adaption to those of the hollow part 8 of base frame 1 (as FIGS. 4, 5 show). At a position against each arcuate clamping piece 9 is provided a multi-refraction unit 13 on the front side of cover frame 3. In length multi-refraction unit 13 is larger than its opposed shock socket 12, which is actually a plurality of sequently connected 45° concave flutes 14 in vertical direction arranged on both inside and outside of the cover frame front side. The lights of lamp 10 sent out of two ends of each non-or-half-translucent shockproof socket 12, therefore, can go through multi-refraction and give each opposed area of cover frame 3 in terms of shaded part of lamp 10 the same degree of brightness, as proved in experiments. Two integrant screw-hole posts 7 are provided on the inside of the upper cross bar 14 of cover frame 3 which extended out of its back side, to get positioning slots 6 of base frame 1 engaged into position. The distance between central screw holes 15 of the two screw-hole posts 7 is adapted to that of the two fixed screw holes in the upper part of license plate (not shown). In this way, when license plate is put behind base frame 1 for assembly, its screw holes can overlap with the central screw holes 15 of screw-hole posts 7 and get screw bolts easily to pass through to fix them together on the vehicle. The power cord of illumination assembly 2 has connection made with the illumination circuit of the vehicle, so a simultaneous action with that circuit is expected.

I claim:

1. A shock absorber for the lamp of an auto license plate holder, comprising:

a base frame being a non-translucent, hollow frame in a rectangular shape of size adapted to a license plate, being open at its front side, and having a chucking piece in the lower area of a back side for being engaged with a lower part of said license plate, two positioning slots in an inside of an upper cross bar and some integrant, arcuate clamping pieces in an annular hollow part;

a cover frame being a translucent, hollow frame having opposed arcuate clamping pieces in a hollow part and adopted to be in alignment with said arcuate clamping pieces in the hollow area of said base frame, and having two integrant screw-hole posts on an inner side of an upper cross bar thereof for engagement with said positioning slots of said base frame;

an illumination assembly consisting of an annular lamp and a transforming PC board, said annular lamp being clamped between said arcuate clamping pieces of said base frame and those in said cover frame;

said annular lamp at each of its clamping positions between respective clamping pieces being sheathed with a shockproof socket, said shockproof socket being made of a heat-resisting material of suitable resilience and being an open, columnar sleeve, said cover frame having some multi-refraction units respectively in opposition against each said columnar sleeve of said annular lamp;

whereby said annular lamp is shockproof and shows an evenly brightened illumination in said cover frame.

2. A shock absorber for the lamp of an auto license plate holder as set fourth in claim 1 wherein said each of said multi-refraction units being a plurality of sequentially connected 45° concave flutes.

* * * * *